(12) United States Patent
Kusano et al.

(10) Patent No.: US 6,641,231 B2
(45) Date of Patent: Nov. 4, 2003

(54) HYDRAULIC BRAKE APPARATUS FOR A VEHICLE

(75) Inventors: Akihito Kusano, Toyoto (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/190,828

(22) Filed: Jul. 9, 2002

(65) Prior Publication Data

US 2003/0020328 A1 Jan. 30, 2003

(30) Foreign Application Priority Data

Jul. 13, 2001 (JP) ........................................ 2001-213184

(51) Int. Cl.⁷ ............................. B60T 13/12; B60T 8/44; B60T 11/00
(52) U.S. Cl. ............... 303/114.1; 188/358; 303/122.09; 303/122.11; 303/DIG. 3; 303/166; 303/113.4
(58) Field of Search ................ 303/114.1, 114.2, 303/166, DIG. 3, DIG. 4, 113.4, 122.09, 122.11, 122.1, 20, 113.1, 116.1–119.1; 60/545; 188/358, 359, 151 A

(56) References Cited

U.S. PATENT DOCUMENTS 6,120,112 A * 9/2000 Toda et al. .................. 303/166
6,290,310 B1 * 9/2001 Kusano .................. 303/122.11

FOREIGN PATENT DOCUMENTS

JP 59-84652 A 5/1984

* cited by examiner

*Primary Examiner*—Douglas C. Butler
(74) *Attorney, Agent, or Firm*—Burns, Doane, Swecker & Mathis, LLP

(57) ABSTRACT

A hydraulic brake apparatus for a vehicle includes a brake operating member, a hydraulic pressure generating source, a regulating valve, a master cylinder having first and second pistons, a pressure detecting means connected to a second pressure chamber for detecting a brake hydraulic pressure outputted from the second pressure chamber, a brake operating amount detecting means for detecting an operating amount of the brake operating member, and a judging means for judging a hydraulic pressure condition of first and second hydraulic systems respectively connected to first and second chambers based upon the brake hydraulic pressure detected by the pressure detecting means relative to the operating amount of the brake operating member detected by the brake operating amount detecting means.

20 Claims, 2 Drawing Sheets

HYDRAULIC BRAKE APPARATUS FOR A VEHICLE

CROSS REFERENCE TO RELATED APPLICATIONS

This application is based on and claims priority under 35 U.S.C. § 119 with respect to a Japanese Patent Application 2001-213184, filed on Jul. 13, 2001, the entire content of which is incorporated herein by reference.

FIELD OF THE INVENTION

This invention generally relates to a hydraulic brake apparatus for a vehicle. More particularly, this invention pertains to a vehicle hydraulic brake apparatus for regulating a hydraulic pressure outputted from a hydraulic pressure generating source in response to a brake operating force and for supplying a brake hydraulic pressure to first and second wheel brake cylinders via first and second master cylinders in response to the regulated hydraulic pressure.

BACKGROUND OF THE INVENTION

There have been various vehicle hydraulic brake apparatuses known. As one of the examples of the vehicle hydraulic brake apparatuses, a Japanese Laid-Open Patent Application No. 59(1984)-84652 discloses a hydraulic type brake generating apparatus which represents the vehicle hydraulic brake apparatus, in which a hydraulic pressure outputted from a hydraulic pressure generating source is regulated in response to a brake operating force and the regulated hydraulic pressure is outputted as a brake hydraulic pressure to first and second wheel brake cylinders via first and second master cylinders.

The above-disclosed hydraulic type brake generating apparatus is provided with a tandem type master brake cylinder having first and second pistons and an operating rod operated in response to a brake operating force. A first pressure chamber is defined in front of the first piston and a second pressure chamber is defined in front of the second piston. The first and second pressure chambers are connected to a first and second brake circuits, respectively. According to the hydraulic type brake generating apparatus with this structure, a first hydraulic pressure is applied to both the operating rod and the first piston. The hydraulic type brake generating apparatus is further provided with a control valve device arranged in parallel with the tandem type master brake cylinder. The hydraulic type brake generating apparatus is still further provided with displacement detecting means for the operating rod and at least for one of the first and second pistons. A displacement amount of the operating rod or a displacement amount of the piston is observed by an observing device.

Figure 1:
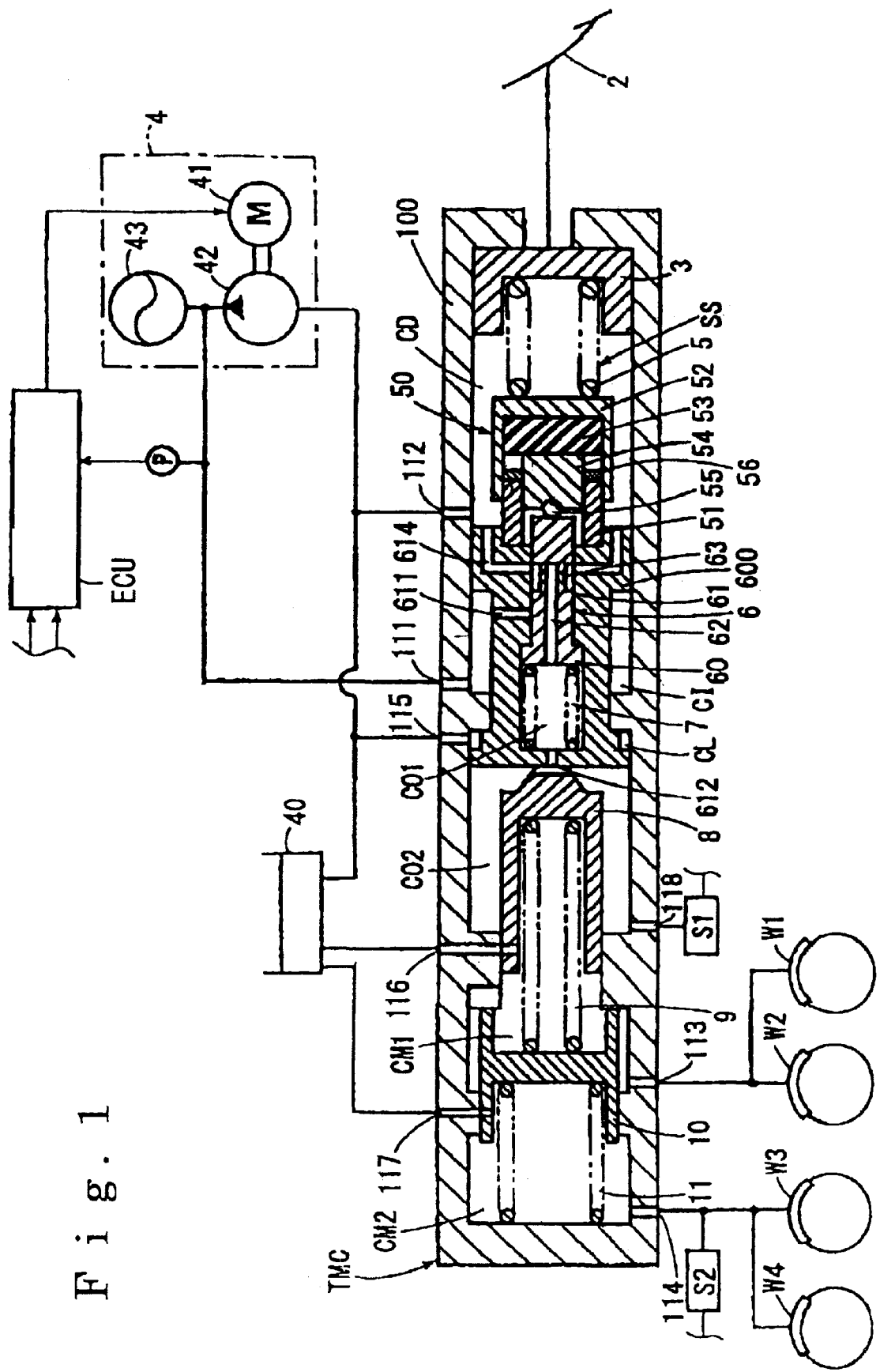

According to the above-described hydraulic type brake generating apparatus, the displacement detecting means for detecting the displacement amount of the piston are directly provided for the master cylinder as illustrated in FIG. 1. In this case, the structure of the hydraulic type brake generating apparatus may be complicated and highly costs for being manufactured. Further, a space of the brake generating apparatus may be limited when being mounted on the vehicle.

Alternatively, a pressure sensor for detecting a hydraulic pressure outputted from the master cylinder can be provided in substitution for the displacement detecting means of the pistons. However, two pressure sensors are required to be respectively connected to the first and second brake circuits. Therefore, the manufacturing cost may be increased. Further, another pressure sensor can be employed for detecting the displacement amount of the operating rod. In this case, the hydraulic type brake generating apparatus requires totally three pressure sensors.

Accordingly, the above disclosed hydraulic type brake generating apparatus is still susceptible of certain improvements with respect to detecting a hydraulic pressure condition of the first and second brake circuits with a simple and down-costed structure.

SUMMARY OF THE INVENTION

A hydraulic brake apparatus for a vehicle includes a brake operating member, a hydraulic pressure generating source for generating and outputting a predetermined hydraulic pressure regardless of a brake operation applied to the brake operating member, a regulating valve regulating the hydraulic pressure outputted from the hydraulic pressure generating source in response to a brake operating force applied to the brake operating member and for outputting a regulated hydraulic pressure, a first master cylinder, a second master cylinder, a first hydraulic system, and a second hydraulic system. The first master cylinder includes a first master piston operated in response to the hydraulic pressure outputted from the regulating valve and a first pressure chamber outputting a first brake hydraulic pressure. The second master cylinder includes a second master piston operated in response to the brake hydraulic pressure outputted from the first master cylinder and a second pressure chamber outputting a second brake hydraulic pressure. The first hydraulic system supplies the first brake hydraulic pressure outputted from the first pressure chamber to a first wheel brake cylinder. The second hydraulic system supplies the second brake hydraulic pressure outputted from the second pressure chamber to a second wheel brake cylinder. Further, an output diameter of the first master piston differs from an output diameter of the second master piston.

The hydraulic brake apparatus for a vehicle further includes a pressure detecting means connected to the second pressure chamber for detecting the second brake hydraulic pressure outputted from the second pressure chamber, a brake operating amount detecting means for detecting a brake operating amount of the brake operating member, and a judging means for judging a hydraulic pressure condition of the first and second hydraulic systems based upon the brake hydraulic pressure detected by the pressure detecting means relative to the brake operating amount detected by the brake operating amount detecting means.

BRIEF DESCRIPTION OF THE DRAWING FIGURES

Figure 2:
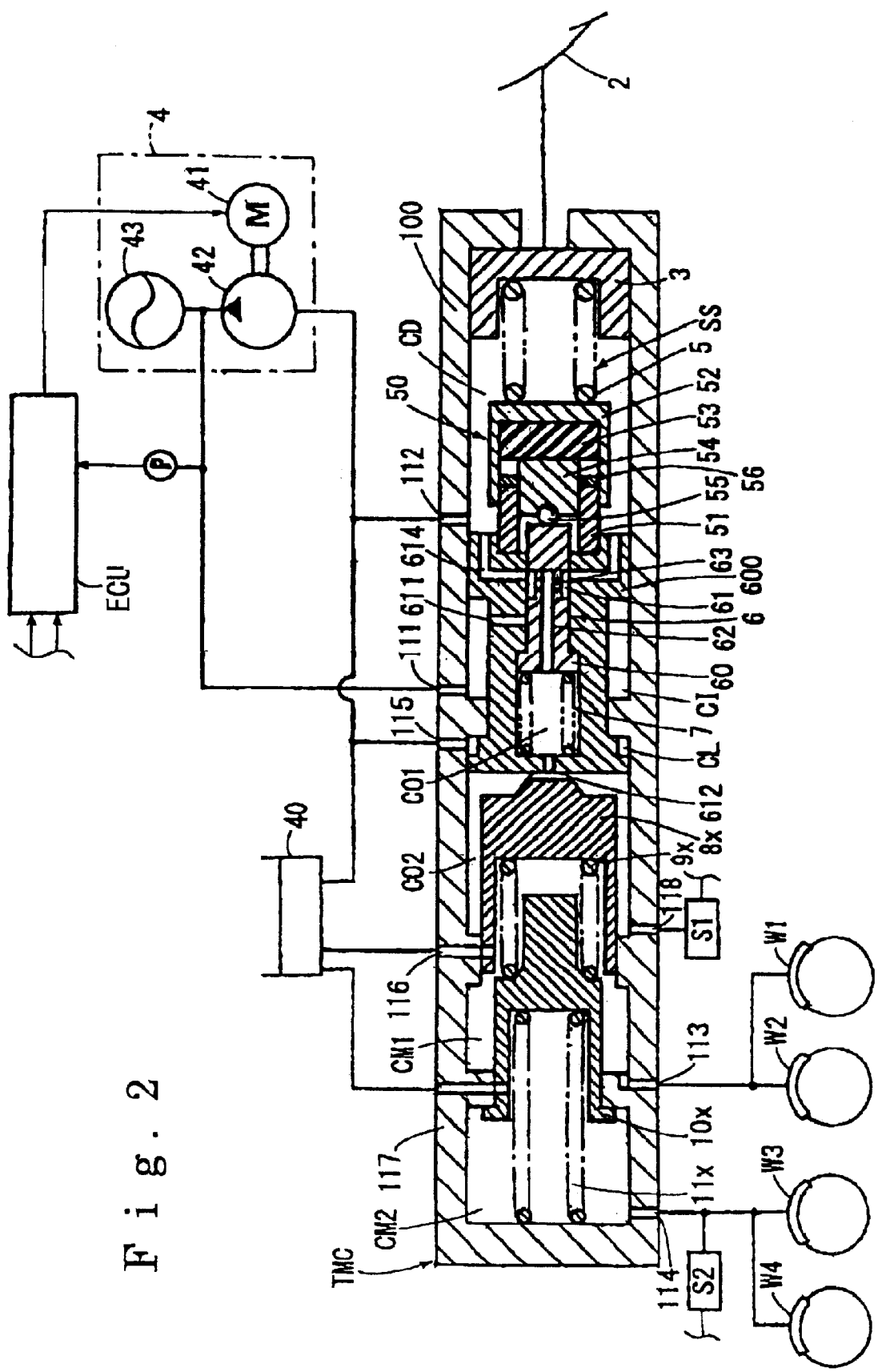

The foregoing and additional features and characteristics of the present invention will become more apparent from the following detailed description considered with reference to the accompanying drawing figures wherein:

FIG. 1 is a cross-sectional view illustrating a hydraulic brake apparatus for a vehicle according to a first embodiment of the present invention; and FIG. 2 is a cross-sectional view illustrating the hydraulic brake apparatus for the vehicle according to a second embodiment of the present invention.

DETAILED DESCRIPTION OF THE INVENTION

Referring to FIG. 1, a vehicle hydraulic brake apparatus according to a first embodiment of the present invention is provided with a hydraulic pressure generating source 4 for generating and outputting a predetermined hydraulic pressure regardless of a brake operation applied to a brake pedal 2 (a brake operating member). The hydraulic pressure generating source 4 is connected to a cylinder 100 (including a cylinder portion) and is provided with, an electric motor 41 controlled by an electronic control unit ECU, a hydraulic pressure pump 42 driven by the electric motor 41, and an accumulator 43. An inlet side of the hydraulic pressure pump 42 is connected to a reservoir 40 and an outlet side thereof is connected to the accumulator 43. The outlet side of the hydraulic pressure pump 42 is further connected to a pressure sensor P for detecting the hydraulic pressure outputted from the accumulator 43. The hydraulic pressure detected by the pressure sensor P is observed by the ECU. The electric motor 41 is controlled by the ECU so as to maintain the observed hydraulic pressure value of the accumulator 43 between a predetermined upper threshold value and a predetermined lower threshold value.

The cylinder 100 houses an input member 3 operatively associated with the brake pedal 2, a coil spring 5, and a distribution device 50. The coil spring 5 transmits a brake operating force applied to the input member 3 and applies a stroke in response to the brake operating force to the input member 3. A stroke simulator SS is formed with the input member 3, the coil spring 5, and the distribution device 50. The coil spring 5 can be substituted by an elastic member such as a rubber and an air spring. The cylinder 100 further houses a regulating valve 6 for regulating the hydraulic pressure outputted from the hydraulic pressure generating source 4 in response to the brake operating force transmitted from the input member 3 via the coil spring 5 and the distribution device 50. The regulating valve 6 is disposed coaxially with the input member 3 and the distribution device 50. In other words, the coil spring 5 extends between the regulating valve 6 and the input member 3 via the distribution device 50.

Further, the cylinder 100 includes an inlet port 111 communicating with an auxiliary hydraulic chamber CO1 via the regulating valve 6, a drain port 112 communicating with a drain chamber CD, outlet ports 113, 114 respectively communicating with a master hydraulic chamber CM1 (a first pressure chamber) and the other master hydraulic chamber CM2 (a second pressure chamber), a low pressure port 115 communicating with a low pressure chamber CL, another low pressure port 116 communicating with the master hydraulic chamber CM1 via a master piston 8 (a first master piston), and another low pressure port 117 communicating with the master hydraulic chamber CM2 via a master piston 10 (a second master piston). An outlet side of the hydraulic pressure generating source 4 is connected to the inlet port 111 of the cylinder 100. An inlet side of the hydraulic pressure generating source 4 is connected to the reservoir 40 and the drain port 112 of the cylinder 100. The reservoir 40 is connected to the low pressure ports 115, 116, 117.

The cylinder 100 further houses a cylinder 600 and a coil spring 7. The cylinder 600 serves as a housing of the regulating valve 6 so as to be salidably movable in the cylinder 100. The coil spring 7 is disposed at the front side of the cylinder 600 and biases the regulating valve 6 in a direction for returning the regulating valve 6 to an initial position thereof, i.e. in a right direction of FIG. 1. An input hydraulic chamber CI and the low pressure chamber CL are defined between an inner peripheral surface of the cylinder 100 and an outer peripheral surface of the cylinder 600. The auxiliary hydraulic chamber CO1 is defined in the cylinder 600. The cylinder 600 includes communicating bores 611, 612, 614. The communicating bore 611 communicates with the inlet port 111 via the input hydraulic chamber CI. The auxiliary hydraulic chamber CO1 communicates with an auxiliary hydraulic chamber CO2 via the communicating bore 612. The communicating bore 614 connects the auxiliary hydraulic chamber CO1 and the drain chamber CD via the regulating valve 6.

As described above, the auxiliary hydraulic chamber CO1 is defined in front of the regulating valve 6 and the drain chamber CD is defined behind thereof. The drain chamber CD houses the input member 3, the coil spring 5, and the distribution device 50. The auxiliary hydraulic chamber CO1 houses the coil spring 7. Assuming that the hydraulic pressure generating source 4 normally functions, the hydraulic pressure outputted from the hydraulic pressure generating source 4 is supplied to the input hydraulic chamber CI via the inlet port 111, wherein the cylinder 600 is maintained at an initial position illustrated in FIG. 1. At the meantime, assuming that the hydraulic pressure generating source 4 malfunctions, the cylinder 600 is released from being maintained at the initial position and becomes slidably movable in a front direction of the cylinder 600, i.e. in a left direction of FIG. 1. Each cylinder 100 and 600 is required to be divided into various components considering assembling each cylinder 100 and 600. However, as illustrated in FIGS. 1, 2 each cylinder 100 and 600 is illustrated as a single component for simplifying the description from a designing point of view.

The regulating valve 6 according to the present invention defines an annular groove 61 at an outer peripheral surface of a spool 60, an axial hole 62 opening at a front side of the regulating valve 6, and an axial communicating bore 63. The axial hole 62 communicates with the annular groove 61 via the communicating bore 63. A front end portion of the spool 60 has a large diameter and movably supported in the auxiliary hydraulic chamber CO1. A rearward movement of the front end portion of the spool 60 is restrained when being engaged with a stepped portion at a rear end of the auxiliary hydraulic chamber CO1. Therefore, although the regulating valve 6 has been biased by the coil spring 7 in a rearward direction, i.e. in the right direction of FIG. 1, the front end portion of the spool 60 is maintained being pushed to the stepped portion at the rear end of the auxiliary hydraulic chamber CO1 when the brake pedal 2 has not bee depressed. In such a case, the annular groove 61 of the spool 60 faces with the communicating bore 614 and the inlet port 611 is interrupted to communicate with the auxiliary hydraulic chamber CO1 by the spool 60. Therefore, the auxiliary hydraulic chamber CO1 communicates with the drain chamber CD via the hole 62, the communicating bore 63, the annular groove 61, and the communicating bore 614, wherein the auxiliary hydraulic chamber CO1 is set under an output force decreasing condition.

When the annular groove 61 is positioned not to communicate with both the communicating bore 614 and the inlet port 611 in response to a forward movement of the spool 60, the auxiliary hydraulic chamber CO1 is interrupted to communicate with the drain chamber CD and the inlet port 611 Therefore, the auxiliary hydraulic chamber CO1 is set under an output force maintaining condition with a constant pressure level therein (and in the auxiliary hydraulic chamber CO2).

When the annular groove 61 is positioned to communicate with the inlet port 611 in response to a further forward movement of the spool 60, the auxiliary hydraulic chamber CO1 communicates with the hydraulic pressure generating source 4 via the hole 62, the communicating bore 63, the annular groove 61, the inlet port 611, the input hydraulic chamber CI, and the inlet port 111. In this case, the annular groove 61 is interrupted to communicate with the drain chamber CD via the communicating bore 614. Therefore, the auxiliary hydraulic chamber CO1 is set under an output force increasing condition in response to the hydraulic pressure supplied to the auxiliary hydraulic chambers CO1, CO2 from the hydraulic pressure generating source 4.

The distribution device 50 is employed for adjusting a relationship between the brake operation force applied to the brake pedal 2 and the hydraulic pressure outputted from the regulating valve 6. The distribution device 50 is formed of a cylindrical member 51 which is in contact with the cylinder 600, a cylindrical movable member 52 with a bottom at one end which slidably houses the cylindrical member 51, a rubber made member 53, a transmitting member 54, a steel ball 55, and a resin made annular plate 56. The rubber made member 53, the transmitting member 54, the steel ball 55, and the resin made annular plate 56 are disposed between the cylindrical member 51 and the cylindrical movable member 52. According to the distribution device 50 with the above described structure, the brake operating force is transmitted to the spool 60 via the input member 3, the coil spring 5, the movable member 52, the rubber member 53, the transmitting member 54, and the steel ball 55. At the meantime, the brake operating force is transmitted to the cylinder 600 via the input member 3, the coil spring 5, the movable member 52, the rubber-made member 53 deformed with an applied pressure, the annular plate 56, and the cylindrical member 51. Therefore, a distributing ratio of the transmitted brake operating force can be changed by changing an inner diameter of the cylindrical member 51 and an outer diameter of the transmitting member 54. Further, a hydraulic pressure value outputted from the regulating valve 6 relative to the brake operating force can be varied by changing an axial length of the transmitting member 54.

A set load of the coil spring 7 is set to be greater than a set load of the coil spring 5. Therefore, the condition illustrated in FIG. 1 can be maintained when the brake pedal 2 is not applied with the depressing force.

A tandem master cylinder TMC (first and second master cylinders) is formed at a front portion of the cylinder 100. The tandem master cylinder TMC is operated in response to the hydraulic pressure outputted from the regulating valve 6. A hydraulic system (a first hydraulic system) is connected to the master hydraulic chamber CM1 and wheel brake cylinders W1, W2 (a first wheel brake cylinder).

The other hydraulic system (a second hydraulic system) is connected to the master hydraulic chamber CM2 and wheel brake cylinders W3, W4 (a second wheel brake cylinder). The tandem master cylinder TMC houses the master piston 8 (the first master piston) and the master piston 10 (the second master piston) to be slidably movable in the cylinder 100. The master piston 8 is biased by coil springs 9, 11 so as to contact a rear end of the master piston 8 with a front end of the cylinder 600. The master hydraulic chambers CM1, CM2 are defined in front of the master pistons 8, 10, respectively. Therefore, the master hydraulic chamber CM1 is allowed or interrupted to communicate with the low pressure port 116 by a skirt portion of the master piston 8 in response to a slidable movement thereof. The master hydraulic chamber CM2 is allowed or interrupted to communicate with the low pressure port 117 by a skirt portion of the master piston 10 in response to a slidable movement thereof.

As illustrated in FIG. 1, an output diameter of the master piston 8 is set to be smaller than an output diameter of the master piston 10. That is, when the master piston 8 is operated and moved greater than a predetermined distance, a front end portion of the master piston 8 is moved into the master piston 10. Therefore, an axial length of the tandem master cylinder TMC can be shortened compared with an axial length of a known tandem master cylinder TMC. Therefore, an entire size of the vehicle hydraulic brake apparatus can be effectively downsized so as to expand the space for assembling the vehicle hydraulic brake apparatus on the vehicle. Further, the output diameter of the master piston 8 differs from the one of the master piston 10. Therefore, the hydraulic pressure condition of each first and second hydraulic system can be judged by the ECU. The judgment is described later.

According to the first and second embodiments of the present invention, a pressure sensor S1 is connected to a port 118 communicating with the auxiliary hydraulic chamber CO2. The pressure sensor S1 serves as a brake operating amount detecting means which is employed for judging whether or not a fluid has been leaked from the first hydraulic system or the second hydraulic system. A brake operating amount of the brake pedal 2 can be detected based upon a hydraulic pressure of the auxiliary hydraulic chamber CO2 detected by the pressures sensor S1. Alternatively, the brake operating amount of the brake pedal 2 can be detected based upon a load applied to the brake pedal 2 detected by a load detecting means (not shown). Further, the brake operating amount of the brake pedal 2 can be detected based upon a stroke of the brake pedal 2 detected by a stroke detecting means (not shown). As described above, the brake operating amount of the brake pedal 2 can be detected by employing the detecting means for another device.

Further, a pressure sensor S2 (a pressure detecting means) is connected to the master hydraulic chamber CM2. A signal representing the pressure level detected by the pressure sensor S2 is supplied to the ECU. Therefore, the hydraulic pressure condition of the first and second hydraulic systems can be effectively judged based upon a brake hydraulic pressure outputted from the master hydraulic chamber CM2 detected by the pressure sensor S2 and the hydraulic pressure of the auxiliary hydraulic chamber CO2 detected by the pressure sensor S1. The pressure sensors S1, S2 can be downsized so as to expand the space for mounting the vehicle hydraulic brake apparatus on the vehicle. Further, a judging means for judging the hydraulic pressure condition is provided in the ECU.

Next, an operation of the hydraulic brake apparatus with the above-described structure is described below.

When the brake pedal 2 is under a non-operated condition, the input member 3 and the regulating valve 6 are positioned as illustrated in FIG. 1. That is, the front end portion of the spool 60 is biased by the coil spring 7 and is engaged with the stepped portion of the rear end of the auxiliary hydraulic chamber CO1. Under the described condition, the inlet port 611 is interrupted to communicate with the auxiliary hydraulic chamber CO1 by an outer peripheral wall of the spool 60. At the meantime, the annular groove 61 faces with the communicating bore 614. The auxiliary hydraulic chamber CO1 hence communicates with the drain chamber CD via the hole 62, the communicating bore 63, the annular groove 61, and the communicating bore 614, wherein the auxiliary hydraulic chamber CO1 is set under the output force decreasing condition. Therefore, the auxiliary hydraulic chamber CO1 and the drain chamber CD communicate with the reservoir 4 so as to be set at an approximately atmospheric pressure level. Further, the hydraulic pressure outputted from the hydraulic pressure generating source 4 is not supplied to the auxiliary hydraulic chamber CO1, wherein all components included in the cylinder 100 are positioned as illustrated in FIG. 1.

When the brake pedal 2 is applied with the depressing force, the brake operating force is transmitted via the input member 3, the coil spring 5, the distribution device 50, and the regulating valve 6. The coil spring 7 is first compressed and the spool 60 of the regulating valve 6 is then moved in the forward direction in response to the compressing of the coil spring 7. In this case, the input member 3, the coil spring 5, and the distribution device 50 serve as the stroke simulator SS. Corresponding to a further depressing operation of the brake pedal 2 against the biasing force of the coil spring 7, the spool 60 is further moved in the forward direction and the annular groove 61 is positioned not to communicate with the communicating bore 614 and the inlet port 611, wherein the auxiliary hydraulic chamber CO1 is set under the output force maintaining condition.

When the spool 60 is still further moved in the forward direction in response to a still further depressing operation of the brake pedal 2, the communicating bore 614 is interrupted to communicate with the auxiliary hydraulic chamber CO1. At the meantime, the annular groove 61 communicates with the inlet port 611, wherein the regulating valve 6 is operated to be opened. Therefore, the hydraulic pressure outputted from the hydraulic pressure generating source 4 is supplied to the auxiliary hydraulic chambers CO1 and CO2, wherein the auxiliary hydraulic chambers CO1 and CO2 are set under the output force increasing condition.

When the brake pedal 2 is depressed from the output force decreasing condition illustrated in FIG. 1, the hydraulic pressure outputted from the hydraulic pressure generating source 4 is regulated to be decreased down to a hydraulic pressure corresponding to the brake operating force transmitted to the spool 60 from the input member 3 via the coil spring 5 and the distribution device 50 and is applied as a hydraulic pressure of the auxiliary hydraulic chamber CO2 for operating the master pistons 8 and 10.

As described above, when the brake pedal 2 is depressed, the master hydraulic chambers CM1, CM2 output the brake hydraulic pressure in response to the brake operating force. Further, the stroke corresponding to the brake operating force is applied to the input member 3 and the brake pedal 2 in response to the compression of the coil spring 5.

While the brake pedal 2 has been depressed as described above, the signals detected by the pressure sensors S1, S2 have been observed by the ECU. Assuming the brake fluid is leaked from the first hydraulic system, the brake hydraulic pressure of a hydraulic pressure path between the master hydraulic chamber CM 1 and the wheel brake cylinders W1, W2 is decreased. In this case, the master piston 8 becomes in contact with the master piston 10 so that the master pistons 8, 10 are moved in the forward direction as a single unit. As described above, the output diameter of the master piston 8 is set to be smaller than the one of the master piston 10. Therefore, the brake hydraulic pressure detected by the pressure sensor S2 is smaller than the hydraulic pressure is smaller than the hydraulic pressure of the master hydraulic chamber CM2 in a state where the first hydraulic system normally functions. The hydraulic pressure of the master hydraulic chamber CM2 in the sate where the first hydraulic system normally functions is approximately equal to the hydraulic pressure of the master hydraulic chamber CM1. Therefore, the first hydraulic system is judged to have been leaking the fluid therefrom by the judging means of the ECU. Assuming the fluid is leaked from the second hydraulic system, the hydraulic pressure of the master hydraulic chamber CM2 is not increased. Therefore, the second hydraulic system is judged to have been leaking the fluid by the judging means of the ECU when the brake hydraulic pressure detected by the pressure sensor S2 has not been increased even in a case when the brake operating force is detected by the pressure sensor S1.

Should the hydraulic pressure generating source 4 malfunction, the hydraulic pressure outputted from the hydraulic pressure source 4 is not supplied to the auxiliary hydraulic chambers CO1, CO2. Therefore, when the input member 3 is moved in the forward direction in response to the operation of the brake pedal 2, the spool 60 is moved forward against the biasing force of the coil spring 7. Further, the brake operating force of the brake pedal 2 is transmitted to the cylinder 600, the master pistons 8, 10 via the distribution device 50 in response to the forward movement of the input member 3 against the biasing force of the coil spring 5. Therefore, the brake pressure can be supplied to the wheel brake cylinders W1, W2 from the master hydraulic chamber CM1 and the brake pressure can be supplied to the wheel brake cylinders W3, W4 from the master hydraulic chamber CM2.

A vehicle hydraulic brake apparatus according to a second embodiment of the present invention illustrated in FIG. 2 is different from the one of the first embodiment with respect to the relationship between the diameters of the first piston and the second piston. More specifically, according to the second embodiment, an output diameter of a master piston 10$x$ (the second master piston) is structured to be smaller than an output diameter of a master piston 8$x$ (the first master piston). Therefore, a portion of the master piston 10$x$ can be moved into the master piston 8$x$. Spring characteristics of coil springs 9$x$, 11$x$ are adjusted in accordance with the relationship between the output diameters. The other structure of the vehicle hydraulic brake apparatus according to the second embodiment is identical to the one according to the first embodiment, wherein the same components are denoted with the same reference numerals and the description thereof are omitted for simplifying the description. When the master piston 8$x$ is moved forward over a predetermined distance, the master piston 10$x$ is moved into the master piston 8$x$. Therefore, the axial length of the tandem master cylinder TMC can be shortened compared with the known tandem master cylinder TMC.

According to the second embodiment, the signals detected by the pressure sensors S1, S2 have been observed by the ECU as well as the first embodiment while the hydraulic brake apparatus has been activated. Assuming the fluid is leaked from the first hydraulic system, a brake hydraulic pressure of the hydraulic pressure path between the master hydraulic chamber CM 1 and the wheel brake cylinders W1, W2 is decreased. In this case, the master piston 8$x$ becomes in contact with the master piston 10$x$ so that the master pistons 8$x$, 10$x$ are moved in the forward direction as a single unit. As described above, the output diameter of the master piston 10$x$ is set to be smaller than the one of the master piston 8$x$. Therefore, the brake hydraulic pressure detected by the pressure sensor S2 is greater than the hydraulic pressure of the master hydraulic chamber CM2 in the state where the first hydraulic system normally functions. Accordingly, the first hydraulic system is judged to have been leaking the fluid therefrom by the judging means of the ECU. Assuming the fluid is leaked from the second hydraulic system, the hydraulic pressure of the master hydraulic chamber CM2 is not increased. Therefore, the second hydraulic system is judged to have been leaking the fluid by the judging means of the ECU when the brake hydraulic pressure detected by the pressure sensor S2 has not been increased even in a case when the brake operating force is detected by the pressure sensor S1.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle, comprising:
   a brake operating member;
   a hydraulic pressure generating source for generating and outputting a predetermined hydraulic pressure regardless of a brake operation applied to the brake operating member;
   a regulating valve regulating the hydraulic pressure outputted from the hydraulic pressure generating source in response to a brake operating force applied to the brake operating member and for outputting a regulated hydraulic pressure;
   a first master cylinder including:
      a first master piston operated in response to the hydraulic pressure outputted from the regulating valve; and
      a first pressure chamber outputting a first brake hydraulic pressure;
   a second master cylinder including:
      a second master piston operated in response to the brake hydraulic pressure outputted from the first master cylinder; and
      a second pressure chamber outputting a second brake hydraulic pressure;
   a first hydraulic system for supplying the first brake hydraulic pressure outputted from the first pressure chamber to a first wheel brake cylinder;
   a second hydraulic system for supplying the second brake hydraulic pressure outputted from the second pressure chamber to a second wheel brake cylinder, wherein an output diameter of the first master piston differs from an output diameter of the second master piston;
   a pressure detecting means connected to the second pressure chamber for detecting the second brake hydraulic pressure outputted from the second pressure chamber;
   a brake operating amount detecting means for detecting a brake operating amount of the brake operating member; and
   a judging means for judging a hydraulic pressure condition of the first and second hydraulic systems based upon the brake hydraulic pressure detected by the pressure detecting means relative to the brake operating amount detected by the brake operating amount detecting means.

2. A hydraulic brake apparatus for a vehicle, according to claim 1 further comprising:
   a stroke simulator disposed between the brake operating member and the regulating valve and applying a stroke to the brake operating member corresponding to the brake operating force applied to the brake operating member.

3. A hydraulic brake apparatus for a vehicle, according to claim 1, wherein the brake operating amount detecting means includes a pressure sensor for detecting the hydraulic pressure outputted from the regulating valve and detects the brake operating amount of the brake operating member based upon the hydraulic pressure detected by the pressure sensor.

4. A hydraulic brake apparatus for a vehicle, according to claim 2, wherein the brake operating amount detecting means includes a pressure sensor for detecting the hydraulic pressure outputted from the regulating valve and detects the brake operating amount of the brake operating member based upon the hydraulic pressure detected by the pressure sensor.

5. A hydraulic brake apparatus for a vehicle, according to claim 1, wherein the brake operating amount detecting means includes a load detecting means for detecting a load applied to the brake operating member and detects the brake operating amount of the brake operating member based upon the load detected by the load detecting means.

6. A hydraulic brake apparatus for a vehicle, according to claim 2, wherein the brake operating amount detecting means includes a load detecting means for detecting a load applied to the brake-operating member and detects the brake operating amount of the brake operating member based upon the load detected by the load detecting means.

7. A hydraulic brake apparatus for a vehicle, according to claim 1, wherein the brake operating amount detecting means includes a stroke detecting means for detecting a stroke of the brake operating member and detects the brake operating amount of the brake operating member based upon the stroke detected by the stroke detecting means.

8. A hydraulic brake apparatus for a vehicle, according to claim 2, wherein the brake operating amount detecting means includes a stroke detecting means for detecting a stroke of the brake operating member and detects the brake operating amount of the brake operating member based upon the stroke detected by the stroke detecting means.

9. A hydraulic brake apparatus for a vehicle, according to claim 1, wherein the output diameter of the first master piston is set to be smaller than the output diameter of the second master piston, wherein a portion of the first master piston is movable into the second master piston.

10. A hydraulic brake apparatus for a vehicle, according to claim 2, wherein the output diameter of the first master piston is set to be smaller than the output diameter of the second master piston, wherein a portion, of the first master piston is movable into the second master piston.

11. A hydraulic brake apparatus for a vehicle, according to claim 1, wherein the output diameter of the second master piston is set to be smaller than the output diameter of the first master piston, wherein a portion of the second master piston is movable into the first master piston.

12. A hydraulic brake apparatus for a vehicle, according to claim 2, wherein the output diameter of the second master, piston is set to be smaller than the output diameter of the first master piston, wherein a portion of the second master piston is movable into the first master piston.

13. A hydraulic brake apparatus for a vehicle, according to claim 1, wherein the first master cylinder is arranged in series with the second master cylinder, the first pressure chamber is defined between the first master piston and the second master piston.

14. A hydraulic brake apparatus for a vehicle, according to claim 1, further comprising:
   an electronic control unit for activating the hydraulic pressure generating source; and
   the judging means provided in the electronic control unit.

15. A hydraulic brake apparatus for a vehicle, according to claim 2, wherein the stroke simulator includes an elastic member disposed between the regulating valve and the brake operating member through a first retainer at the regulating valve side and a second retainer at the input member.

16. A hydraulic brake apparatus for a vehicle, according to claim 15, wherein the elastic member is a coil spring to be compressed in response to the brake operating force applied to the brake operating member.

17. A hydraulic brake apparatus for a vehicle, according to claim 15, wherein the elastic member is a rubber-made member.

18. A hydraulic brake apparatus for a vehicle, according to claim 1, further comprising:
   a first port defined in the first roaster cylinder for supplying a fluid from a reservoir into the first pressure chamber;
   a second port defined in the second master cylinder for supplying a fluid from the reservoir into the third pressure chamber;
   a cylinder portion having the regulating valve including:
      a third pressure chamber supplied with the hydraulic pressure outputted from the regulating valve and applying the hydraulic pressure to the first master piston;
      a third port defined in the cylinder portion for connecting the third pressure chamber and the brake operating amount detecting means, wherein the brake operating amount detecting means detects the brake operating amount of the brake operating member.

19. A hydraulic brake apparatus for a vehicle, according to claim 18, wherein the brake operating amount detecting means includes a pressure sensor.

20. A hydraulic brake apparatus for a vehicle, according to claim 18, further comprising:
   the hydraulic pressure generating source including:
      an electric motor driven by the electronic control unit;
      an accumulator for accumulating a fluid;
      a hydraulic pressure pump operated by an electric motor and outputting the fluid from the accumulator, wherein the outputted fluid is regulated to be decreased by the regulating valve and is supplied to the third pressure chamber in response to the brake operating force applied to the brake operating member.

* * * * *